Nov. 3, 1959  W. F. STREHLOW  2,911,229
DEVICE FOR VARYING THE STEERABLE WHEEL TREAD OF VEHICLES
Filed Oct. 18, 1956  3 Sheets-Sheet 3

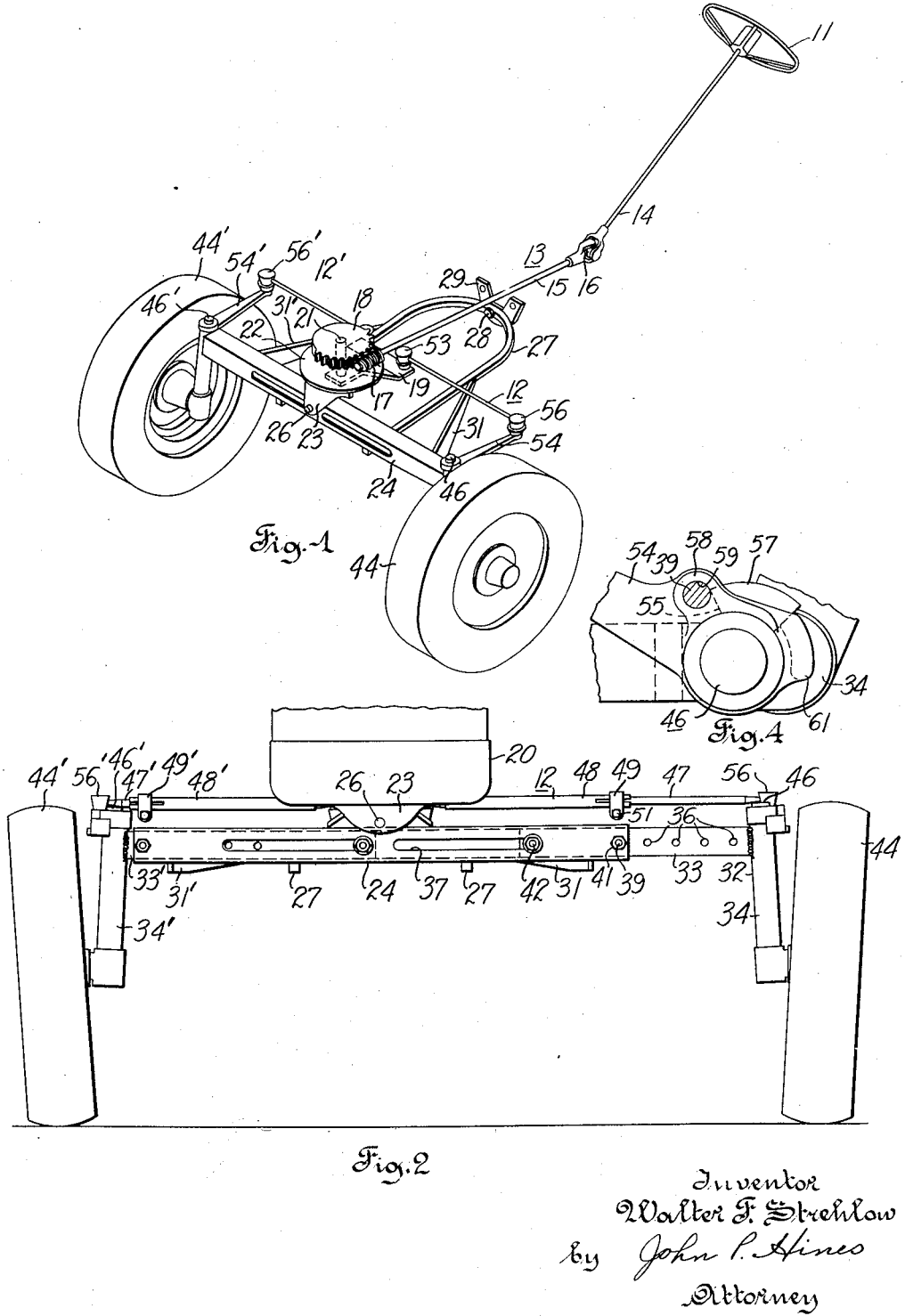

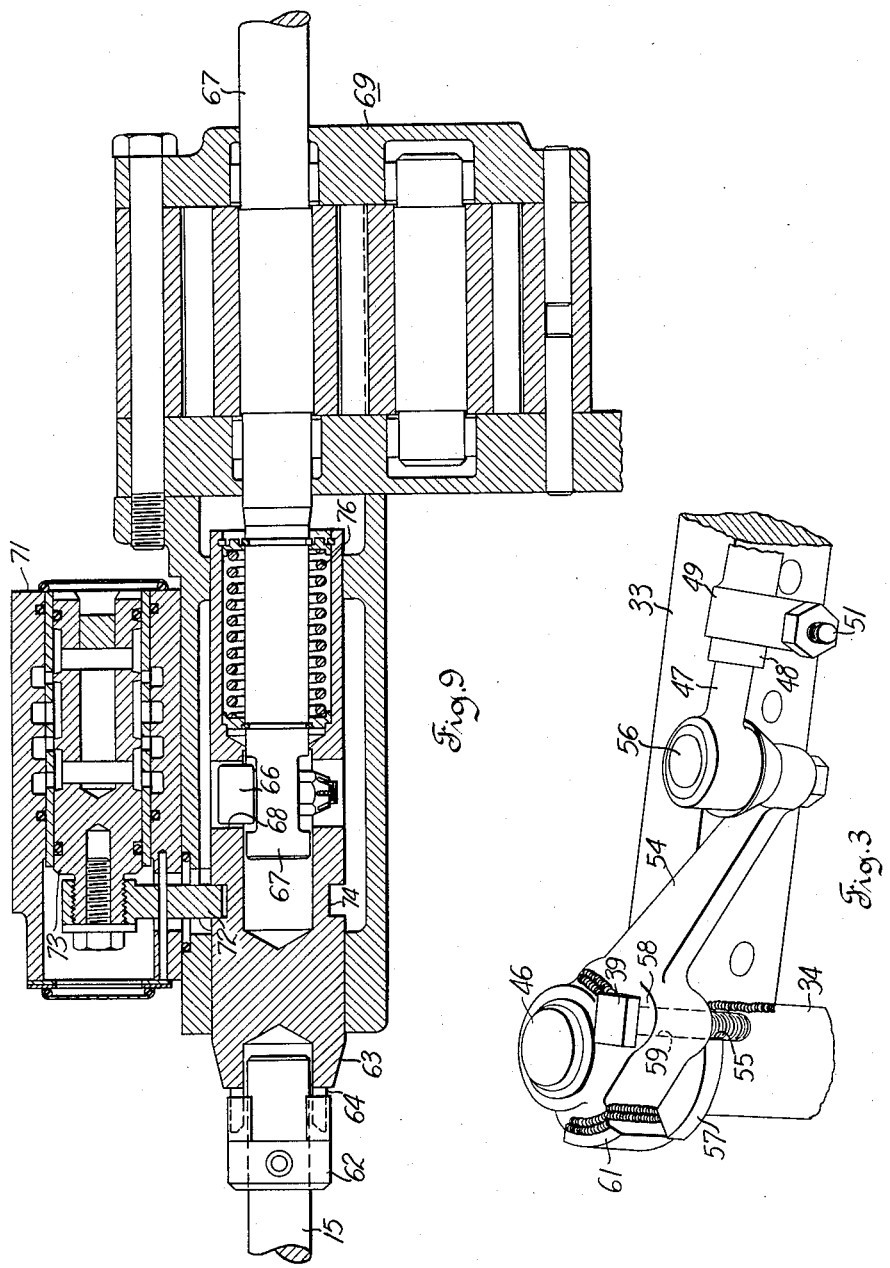

Inventor
Walter F. Strehlow
By John P. Hines
Attorney

United States Patent Office 2,911,229
Patented Nov. 3, 1959

2,911,229

DEVICE FOR VARYING THE STEERABLE WHEEL TREAD OF VEHICLES

Walter F. Strehlow, Wauwatosa, Wis., assignor to Allis-Chalmers Manufacturing Company, Milwaukee, Wis.

Application October 18, 1956, Serial No. 616,690

9 Claims. (Cl. 280—96)

This invention pertains to vehicles and more particularly to vehicles of the type in which the span between a pair of transversely spaced steerable wheels may be adjusted so as to widen or narrow the tread spacing of such wheels.

In row crop farming it is frequently necessary to vary the lateral spacing of tractor wheels so that they will straddle rows of crops which may be of several different spacings, depending on the type of crop involved. Both steered and drive wheels need to be so adjusted. One satisfactory method of adjusting the lateral spacing of the drive wheels is by utilizing engine power to spin one drive wheel outward on a spiral rail while the other drive wheel is held against movement. This method is shown in my U.S. Patent 2,417,139, entitled Variable Wheel Tread Vehicle, issued March 11, 1947.

Numerous ways have been devised to vary the tread of tractor steerable wheels, but these previously suggested arrangements have not proven entirely satisfactory. Most known methods of adjusting the tread of the tractor front wheels require additional equipment such as a hoist or jack to raise the wheels off the ground during adjustment. With the wheels off the ground the steerable wheel axle is extended by utilizing the mechanical advantage of a rack and pinion, worm and pinion, screw or it may be extended by hand. All of these previous methods require considerable time and effort. The present invention contemplates the introduction of a tractor having an adjustable front axle which avoids the shortcomings and inadequacies of the prior art and which constitutes a novel and extremely useful mechanism.

It is a general object of the invention to provide a tractor having an adjustable front axle and steering mechanism with means to permit the front wheel tread to be adjusted by the steering mechanism.

Another object is to provide a tractor, of the character hereinbefore described having power steering, with suitable mechanical linkage to utilize the power from the power steering to extend or contract the adjustable front axle.

More specifically, it is an object of the invention to provide a tractor, of the character hereinbefore described having a tie rod structure, with suitable locking mechanism to hold one of the steerable wheels against rotation so that the tie rod structure may be used to transmit the force required to adjust the front axle carrying said one steerable wheel.

Further, it is an object of the invention to provide a tractor having an adjustable front axle with a locking mechanism holding a steerable wheel against rotation after the steerable wheel has been turned to an extreme steered position, in which position the steerable wheel will roll on the ground as the axle is adjusted.

A further object of the invention is to provide a tractor of the character hereinbefore described with sufficient adjusting mechanism as a part of the tractor thereby overcoming the necessity of using auxiliary equipment.

The foregoing and other objects and advantages of the invention will become more fully apparent from the following description of the invention shown in the accompanying drawings.

Referring to the following drawings wherein like reference characters designate the same or similar parts in the various views:

Fig. 1 is a perspective view of a tractor steering system and adjustable front axle;

Fig. 2 is a front elevation of a portion of a tractor having an adjustable front axle including a pair of laterally adjustable and steerable wheels;

Fig. 3 is a perspective view showing means for locking one of the tractor front wheels against steering movement;

Fig. 4 is a plan view of Fig. 3;

Fig. 9 is a sectional view of a power steering unit.

Figure 5:
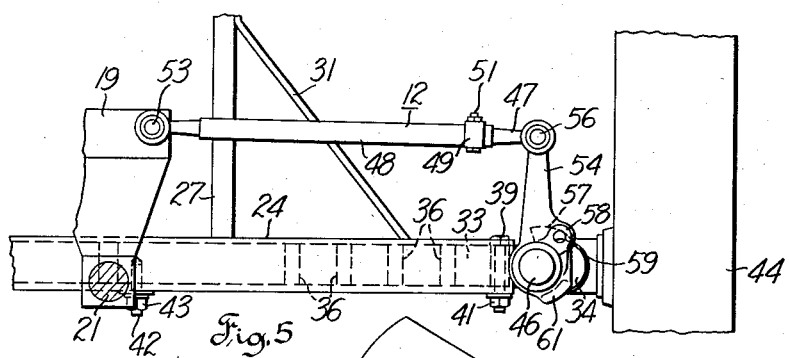
Figs. 5, 6, 7 and 8 are plan views of adjusting mechanism for the adjustable axle, each showing a stage of the extension of the axle.

Referring to Fig. 1, a manually operated steering wheel 11 is operably connected to a link or tie rod structure 12 by a steering train generally designated 13. The steering train 13 includes a steering wheel shaft 14 rigidly secured to the steering wheel 11, a worm shaft 15, a universal joint 16 connecting the shafts 14 and 15, a worm 17 integral with the worm shaft 15, a worm wheel 18 mating with worm 17, and a crank 19 spaced vertically from and rotating in unison with the worm wheel 18. The crank 19 and worm wheel 18 are rigidly secured to opposite ends of a common vertically disposed shaft 21 which is journaled intermediate its ends in a mounting plate 22. The mounting plate 22 is integral with a bracket 23 and these parts are fixedly secured to the tractor frame 20 (shown in Fig. 2). An axle support 24 is pivotally connected by a pivot pin 26 to the bracket 23. The axle support or axle housing 24 has a U-brace 27 rigidly secured to it; the U-brace being pivotally connected by a bolt 28 to a frame piece 29 which is rigidly secured to the tractor frame 20. Bracing struts 31 and 31' are welded to the U-brace 27 and axle housing 24 for added strength.

Inasmuch as this invention pertains to a vehicle having a pair of laterally spaced steerable wheels, and each wheel has similar supporting and actuating structure, the remaining description will describe the structure for only one of these wheels. However, for clarity, prime numbers are used to designate the corresponding elements for that side of the tractor shown in the drawings but not described.

As best shown in Fig. 2, an axle structure 32, composed of an axle 33 and a spindle mounting member 34, is slidably and nonrotatably contained in the axle housing 24. The axle 33, which is rectangular in cross section, has a series of laterally spaced parallel bores 36 which are selectively alignable with a slot 37 and aligned holes 38 and 38a (shown in Fig. 7) in the axle housing 24. Fastening means in the form of a stop bolt 39 and a nut 41 and a stud bolt 42 and a nut 43 releasably secure the axle 33 to the axle housing 24. Increment adjustment of the axle 33 relative to the axle housing 24 is possible due to the provision of a plurality of spaced bores 36. The maximum amount of relative adjustment is determined by the length of the slot 37 since the stud bolt 42 slides back and forth within the slot as the axle 33 is extended or contracted. A steerable ground engaging wheel 44 is rotatably mounted, in a conventional manner, to a spindle assembly 46 which is rotatably contained within the spindle mounting member 34.

Figure 8:
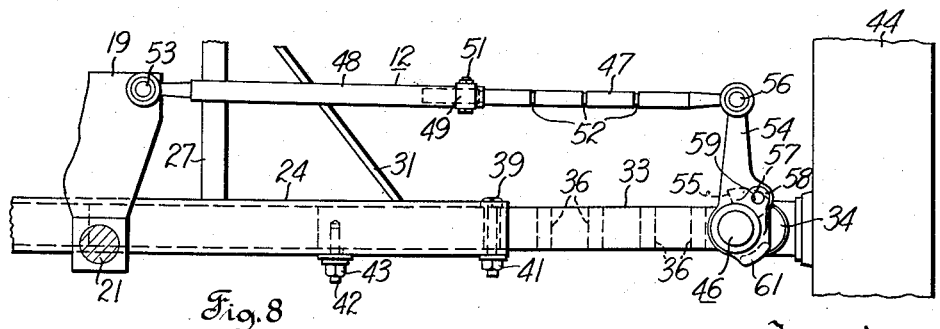

Referring to Fig. 8, the tie rod structure 12 is composed of an inner adjustable drag link 47 releasably secured within an outer adjustable drag link 48 by a clamp 49 and clamp bolt 51. The inner drag link 47 has annular grooves 52 spaced axially along its length. The grooves 52 are spaced at increments corresponding to the increment spacing of the parallel bores 36 in the axle 33 thereby providing the operator with an easy guide for adjusting the tie rod structure 12 to correspond to the adjusted position of the axle 33. The drag links 47 and 48 must be adjusted for each position of the axle 33.

The outer adjustable drag link 48 is pivotally connected to the crank 19 by a conventional ball and socket joint 53. The inner adjustable drag link 47 is pivotally connected to a spindle arm 54 by another ball and socket joint 56. The spindle arm 54 is rigidly secured to the upper end of the spindle assembly 46. This arrangement allows pivotal movement of the crank 19 to be transmitted through the drag links 47 and 48 and the spindle arm 54 to the spindle assembly 46 and hence to the steerable wheel 44.

The tie rod structure 12 is in effect a thrust transmitting member which transmits both the steering movement and the force necessary to extend or contract the axle structure 32. The ball and socket joint 56 constitute motion transmitting portions of which the ball is one portion and the socket another.

In Figs. 3 and 4 a protrusion or radially projecting flange sector 57 having a vertically extending abutment surface 55 is welded to the spindle mounting member 34. The spindle arm 54 has a boss 58 formed thereon which passes over the flange sector 57 as the spindle assembly 46 and spindle arm 54 rotate relative to the spindle mounting member 34. A hole 59 extends vertically through the boss 58. The stop bolt 39 is shown in the hole 59 and in contact with the flange sector 57. A shoulder 61 is welded to the spindle arm 54 at a point spaced circumferentially from the boss 58. The shoulder 61 and flange sector 57 combine to form one type of stop means. The shoulder 61 extends beneath the spindle arm 54 and contacts the flange sector 57 thereby limiting movement in one direction, between the spindle arm 54 and spindle mounting member 34. Applicant has also shown one type of locking means with the provision of bolt 39 and boss 58. With the bolt 39 and the shoulder 61 contacting the flange sector 57 on opposite sides no relative rotation between the spindle assembly 46 and spindle mounting member 34 is possible. Thus the stop bolt 39 is interposed between vertically extending abutment surface 55 and the vertically extending abutment surface or hole 59 in boss 58, and thereby the wheel 44 is locked in an extreme left hand steered position. It should be noted that stop bolt 39 acts as a selectively engageable locking member when it is inserted in the hole 59 in boss 58.

The operation of my invention can best be described by referring to Figs. 5, 6, 7 and 8, which show the left hand portion of the tractor front end support; that is left hand as viewed from the operator's station. In Fig. 5 the tie rod structure 12 and the axle 33 are in the full contracted position. The nuts 41 and 43 are tight on the stop bolt 39 and stud bolt 42, respectively, and drag links 47 and 48 are held in the contracted position by clamp 49 and clamp bolt 51.

The right hand tie rod clamp 49' may be loosened so that drag links 47' and 48' (shown in Fig. 2) may telescope during the entire left hand wheel tread adjustment. It is not imperative that the right tie rod clamp be loose when extending the left axle in the manner described herein. However, it is preferred as considerable friction is set up between the right steerable wheel and the ground as the steering wheel is turned and therefore, considerable effort is required of the operator to overcome this friction, especially so when the tractor is not equipped with power steering. With the right tie rod structure loose this frictional force is not present as the tie rod drag links freely slide back and forth as the steering wheel is actuated.

Figure 6:
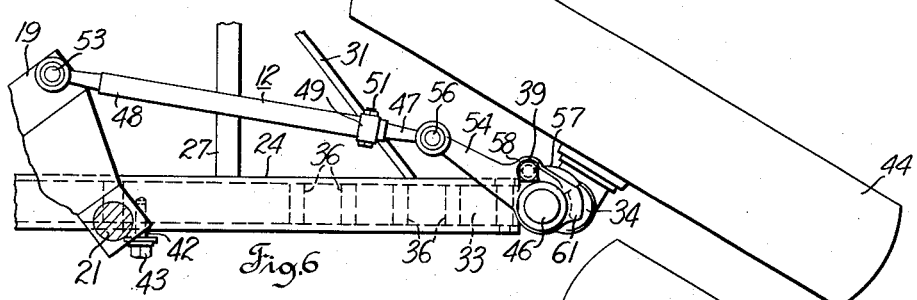

In Fig. 6 the steering wheel 11 has been turned to the extreme left pivoting the crank 19 and spindle arm 54 to the right and rotating the steerable wheel 44 in position for a sharp left turn. The nut 43 on the stud bolt 42 has been loosened and the stop bolt 39 has been removed from the parallel bore 36 and placed in the hole 58 (shown in Fig. 3). The tie rod clamp 49 is tight, thereby holding the drag links 47 and 48 from relative movement.

Figure 7:
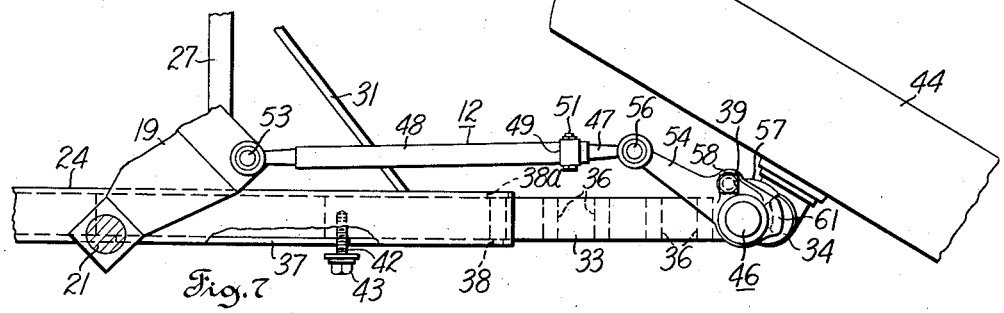

Referring to Fig. 7, the axle 33 has been extended to the maximum position as witnessed by the stud bolt 42 being in contact with the left end of the slot 37. This position is reached by turning the steering wheel to the extreme right position. As the steering wheel is turned to the right the crank 19 pivots to the left and through the tie rod structure 12 attempts to pivot the steering arm 54 in the same direction. However, due to the coaction of the stop bolt 39 and the flange sector 57 no rotative movement is possible and the pivotal movement of the crank 19 is converted to lineal movement of the rotatively restrained spindle arm 54 thereby rolling the steerable wheel 44 outward as the axle 33 is extended. If the right tie rod clamp 49' is loosened, the right tie rod drag links 47' and 48' extend and there is no movement of the right steerable wheel during axle extension.

In Fig. 8, with the axle 33 extended to the desired position, the stop bolt 39 is removed from the hole 59 and replaced in aligned holes 38 and 38a and through a corresponding aligned bore 36. The nuts 41 and 43 are tightened on the stop bolt 39 and stud bolt 42, respectively, to prevent any further movement of the axle 33. After loosening the tie rod clamp 49 the steering wheel 11 can be turned so that the drag links 47 and 48 are adjusted to correspond to the extended position of the axle 33.

A similar procedure is followed in extending the right hand axle.

A high percentage of farm tractors are equipped with power steering and the invention herein described and claimed can be used to good advantage on a tractor incorporating power steering. With power steering in the tractor incorporating this invention, the tread spacing is adjusted by power means.

Fig. 9 shows a power steering unit which could be incorporated in the steering mechanism of a tractor. A coupling 62 connects the worm shaft 15 to a cylindrical sleeve 63. Axial movement of the sleeve 63 is possible due to elongated teeth 64 which are integral with the sleeve 63 and which mate with the coupling 62. A cam follower roller 66 is bolted to a shaft 67 which is in turn connected to the lower portion of worm shaft 16 in any conventional manner (not shown). The roller 66 rides in a helical slot 68 formed on the periphery of the sleeve 63. The shaft 67 is keyed to a fluid gear motor 69 so that actuation of the gear motor 69 imparts a rotative motion to the shaft 67. A valve 71 controls the flow of fluid from a pump (not shown) to the gear motor 69, and the direction of rotation of the shaft 67 is determined by the direction of actuation of control valve spool 73. One end of a lever 72 is adjustably secured to the spool 73 while the opposite end of the lever 72 rides in an annular groove 74 cut in the periphery of the sleeve 63.

When the worm shaft 15 is rotated in a clockwise direction by actuation of the steering wheel the right hand surface of the helical slot 68 acts on the roller 66 moving the sleeve 63, the lever 72 and the spool 73 axially to the right compressing a coil spring 76 and allowing oil to flow through the control valve 71 to a predetermined side of the gear motor 69 which imparts a clockwise rotation to the shaft 67. The spring 76 has sufficient energy to relocate the control valve 71 in a neutral position when the worm shaft 15 is no longer being rotated.

It should be understood that it is not intended to limit the invention to the exact details of construction herein described with reference to the drawings, and it

What is claimed is:

1. A mechanism for adjusting the tread of a pair of steerable ground engaging wheels of a vehicle comprising: an axle support secured to said vehicle; an axle structure non-rotatably and slidably supported on said support for lateral extensible and contractible adjustment relative thereto; fastening means releasably securing said axle structure and said support against relative lateral movement; a spindle assembly mounting one of said steerable wheels and pivotally connected to said axle structure for movement between extreme steered positions; a spindle arm operably secured to the upper portion of said spindle assembly; a steering control member mounted on said vehicle; a steering train operably connecting said steering control member to said spindle arm including a link structure disposed in a lateral direction relative to said vehicle, said link structure including a pair of relatively extensible and contractible components releasably secured to one another; and engageable stop means preventing said spindle assembly from rotation in one of said extreme steered positions, said one of said wheels rolling upon the ground as said axle structure is shifted by actuation of said steering control member when said fastening means are released and said stop means is engaged.

2. A mechanism for adjusting the tread of a pair of steerable wheels of a vehicle comprising: an axle support secured to said vehicle; an axle structure nonrotatably and slidably supported on said support for lateral extensible and contractible adjustment relative thereto and including a spindle mounting member with a protrusion thereon; fastening means releasably securing said support and said axle structure against relative lateral movement; a spindle assembly mounting one of said steerable wheels and having a portion pivotally connected to said mounting member; a spindle arm fixedly secured to the upper portion of said spindle assembly and presenting a shoulder and a boss; a steering control member mounted on said vehicle; a steering train operably connecting said steering member with said spindle arm and including a pair of laterally extending relatively extensible and contractible releasably secured components; and a releasable locking member engageable with said boss and protrusion to maintain said protrusion between said locking member and said shoulder thereby locking said spindle assembly against rotation relative to said spindle mounting member, said mounting member being laterally shiftable upon actuation of said steering control member when said fastening means are released and said locking member is engaged.

3. The mechanism as set out in claim 2 wherein said locking member is a removable bolt constituting a removable element of said fastening means.

4. A mechanism for adjusting the tread of a pair of steerable wheels of a vehicle comprising: an axle structure supported on said vehicle for lateral extensible and contractible movement relative thereto; fastening means releasably securing said axle structure to said vehicle; a spindle assembly mounting one of said steerable wheels and pivotally connected to said axle structure for steering movement; a steering train mounted on said vehicle; an adjustable link structure operably connecting said steering train to said spindle assembly to impart a steering motion to the latter; and means releasably locking said spindle assembly against rotation relative to said axle structure, said axle structure being extended or contracted upon actuation of said steering train in one direction after said fastening means are released, said locking means is engaged and said link structure has been adjusted by actuating said steering train in a direction opposite to said one direction.

5. The mechanism as set out in claim 4 wherein said steering train includes a power means.

6. A mechanism for adjusting the tread of a pair of steerable wheels of a vehicle comprising: an axle support carried by the forward end of said vehicle; an axle structure carried by said axle support for lateral extensible and contractible movement relative thereto, said axle structure including a spindle mounting member; fastening means releasably securing said axle structure to said support against lateral movement; a spindle assembly mounting one of said steerable wheels and rotatably secured to said spindle mounting member for steering movement; a steering train operably mounted on said vehicle; an adjustable link structure operably connecting said steering train to said spindle assembly to impart a steering motion to the latter; and means releasably locking said spindle assembly against rotation relative to said spindle mounting member, said axle structure being shifted by said link structure upon actuation of said steering train in one direction after said fastening means are released, said locking means is engaged and said link structure has been adjusted by actuating said steering train in a direction opposite to said one direction.

7. A mechanism for adjusting the tread of a pair of steerable wheels of a vehicle comprising: an axle support carried by the forward end of said vehicle; an axle structure operably connected to said support for lateral extensible and contractible movement relative thereto, said axle structure including a spindle mounting member; fastening means releasably securing said structure to said support against lateral movement; a spindle member mounting one of said steerable wheels and pivotally connected to said spindle mounting member for steering movement; a steering train mounted on said vehicle; an adjustable link structure operably connecting said steering train to said spindle member to impart a steering motion to the latter; vertically extending abutment surfaces formed on said members; and a releasable locking member selectably engageable with said abutment surfaces to hold said spindle member against steering movement in one direction, said axle structure being shifted laterally by said link structure upon actuation of said steering train when said fastening means are released and said locking member is engaged.

8. The mechanism as set out in claim 7 wherein a hole in one of said members presents one of said abutment surfaces.

9. A mechanism for adjusting the tread of a pair of steerable wheels of a vehicle comprising: an axle structure supported on said vehicle for lateral extensible and contractible movement relative thereto; fastening means releasably securing said axle structure to said vehicle; a spindle assembly mounting one of said steerable wheels and pivotally connected to said axle structure for steering movement between extreme steered positions; a steering train mounted on said vehicle; an adjustable link structure operably connecting said steering train to said spindle assembly to impart a steering motion to the latter; and means releasably locking said spindle assembly against rotation in one of said extreme steered positions, said axle structure being extended or contracted upon actuation of said steering train when said fastening means are released and said locking means is engaged.

References Cited in the file of this patent

UNITED STATES PATENTS

| | | |
|---|---|---|
| 2,029,540 | Porteous | Feb. 4, 1936 |
| 2,173,419 | Johnson | Sept. 19, 1939 |
| 2,337,615 | McLaren | Dec. 28, 1943 |
| 2,362,930 | Robbins | Nov. 14, 1944 |
| 2,650,100 | Ronning | Aug. 25, 1953 |
| 2,750,199 | Hart | June 12, 1956 |
| 2,788,858 | Aasland et al. | Apr. 16, 1957 |